(12) United States Patent
Lozano et al.

(10) Patent No.: US 9,988,271 B2
(45) Date of Patent: Jun. 5, 2018

(54) METHOD OF PREPARING CARBON FIBERS

(71) Applicant: The Board of Regents of the University of Texas System, Austin, TX (US)

(72) Inventors: Karen Lozano, Edinburg, TX (US); Lee Daniel Cremar, McAllen, TX (US)

(73) Assignee: Board of Regents of the University of Texas System, Austin, TX (US)

( * ) Notice: Subject to any disclaimer, the term of this patent is extended or adjusted under 35 U.S.C. 154(b) by 561 days.

(21) Appl. No.: 14/557,080

(22) Filed: Dec. 1, 2014

(65) Prior Publication Data

US 2015/0184317 A1    Jul. 2, 2015

Related U.S. Application Data

(60) Provisional application No. 61/910,205, filed on Nov. 29, 2013.

(51) Int. Cl.

| | |
|---|---|
| *D01D 1/02* | (2006.01) |
| *D01D 7/00* | (2006.01) |
| *D01D 10/02* | (2006.01) |
| *D01D 10/06* | (2006.01) |
| *D01F 9/21* | (2006.01) |
| *D01F 11/12* | (2006.01) |
| *D06M 11/55* | (2006.01) |
| *C01B 31/00* | (2006.01) |
| *D04H 1/4242* | (2012.01) |
| *C01B 32/05* | (2017.01) |
| *C01B 32/15* | (2017.01) |

(Continued)

(52) U.S. Cl.
CPC .............. *C01B 31/00* (2013.01); *C01B 32/05* (2017.08); *C01B 32/15* (2017.08); *C01B 32/30* (2017.08); *C01B 32/312* (2017.08); *C01B 32/342* (2017.08); *C01B 32/354* (2017.08); *C01B 32/382* (2017.08); *D01D 5/18* (2013.01); *D01F 9/14* (2013.01); *D01F 11/06* (2013.01); *D04H 1/4242* (2013.01); *D04H 1/72* (2013.01); *D01F 6/14* (2013.01); *Y10T 442/60* (2015.04)

(58) Field of Classification Search
CPC ......... C01B 32/05; C01B 32/15; C01B 32/30; C01B 32/312; C01B 32/342; C01B 32/354; D01D 1/02; D01D 5/18; D01D 7/00; D01D 10/02; D01D 10/06; D01F 9/21; D01F 11/06; D01F 11/12; D06M 11/55
USPC ..... 264/8, 29.2, 29.7, 211.1, 211.12, 211.14, 264/211.15, 211.17, 233, 234, 310, 311; 423/447.1, 447.4, 447.8
See application file for complete search history.

(56) References Cited

U.S. PATENT DOCUMENTS

| | | |
|---|---|---|
| 3,529,934 A | 9/1970 | Shindo et al. |
| 4,284,615 A | 8/1981 | Maruyama |

(Continued)

*Primary Examiner* — Leo B Tentoni
(74) *Attorney, Agent, or Firm* — Meyertons, Hood, Kivlin, Kowert & Goetzel, P.C.; Mark R. DeLuca (57) ABSTRACT

A method of producing carbon fiber, yarns, and nonwoven carbon fiber cloths, includes forming suitable polymeric precursor microfibers and/or nanofibers using a centrifugal spinning process and decomposing at least a portion of the polymeric precursor fibers to form carbon fibers. The decomposition may be accomplished by treating the polymeric precursor fibers with acid vapor from an aqueous acid solution at a temperature of less than 250° C.

11 Claims, 6 Drawing Sheets

(51) Int. Cl.
    *C01B 32/354*   (2017.01)
    *C01B 32/342*   (2017.01)
    *C01B 32/30*    (2017.01)
    *C01B 32/312*   (2017.01)
    *D01D 5/18*     (2006.01)
    *D01F 9/14*     (2006.01)
    *D01F 11/06*    (2006.01)
    *D04H 1/72*     (2012.01)
    *D01F 6/14*     (2006.01)

(56) References Cited

U.S. PATENT DOCUMENTS

| | | | |
|---|---|---|---|
| 5,213,722 A * | 5/1993 | Iwasaki | H01M 2/162 |
| | | | 264/233 |
| 2012/0213985 A1 | 8/2012 | Tsotsis | |
| 2012/0214375 A1 | 8/2012 | Kitano et al. | |
| 2013/0214442 A1* | 8/2013 | Naskar | D01F 9/21 |
| | | | 264/29.2 |
| 2015/0354094 A1* | 12/2015 | Parker | D01D 5/18 |
| | | | 428/221 |

* cited by examiner

METHOD OF PREPARING CARBON FIBERS

PRIORITY CLAIM

This application claims priority to U.S. Provisional Application Ser. No. 61/910,205 entitled "METHOD OF PREPARING CARBON FIBERS" filed Nov. 29, 2013, which is incorporated herein by reference in its entirety.

STATEMENT REGARDING FEDERALLY SPONSORED RESEARCH OR DEVELOPMENT

This invention was made with government support from the National Science Foundation (NSF), Grant number DMR0934157. The U.S. Government has certain rights to this invention.

BACKGROUND OF THE INVENTION

1. Field of the Invention

The present invention generally relates to the field of carbon fiber production. More specifically, the invention relates to carbon fibers of micron, sub-micron, and nanometer size diameters.

2. Description of the Relevant Art

Fibers having small diameters (e.g., micrometer ("micron") to nanometer ("nano")) are useful in a variety of fields from the clothing industry to military applications. For example, in the biomedical field, there is a strong interest in developing structures based on nanofibers that provide a scaffolding for tissue growth to effectively support living cells. In the textile field, there is a strong interest in nanofibers because the nanofibers have a high surface area per unit mass that provide light, but highly wear resistant, garments. As a class, carbon nanofibers are being used, for example, in reinforced composites, in heat management, and in reinforcement of elastomers. Many potential applications for small-diameter fibers are being developed as the ability to manufacture and control their chemical and physical properties improves.

Specifically, carbon fibers (micro, sub micron and nanofibers) have been highly attractive mainly because of their structural performance, though fine carbon fibers also possess attractive applications, for example, as nonwoven cloths for: (1) filtration media where high temperature and corrosive environments are present; (2) filtration media such as activated carbon where the increase in surface area and small porosity enhances the performance; (3) filtration of odors such as in ostomy bags and HEPA filters; (4) energy storage; (5) batteries (anodes), textiles to be used to shield electronics (EMI/RF protection); (5) high temperature fire retardant insulation; (6) nonwoven cloths to be used as prepregs to add strength to composite materials; (7) gas diffusion electrodes and fuel cell electrodes; (8) protective clothing; and (9) thermal and acoustical insulation (aircrafts, automotive) to mention some.

Most small-diameter carbon fibers are made using carbonization methods where high temperatures are used to produce carbon fibers from polymeric materials (e.g., polyacrylonitrile (PAN)). In the case of nanofibers or nanotubes, other processes exist that are mainly dependent on the use of catalysts (e.g., transition metals such as cobalt, nickel or iron) where the carbon fibers are grown through the attachment of carbon atoms flowing in the reactor (e.g., from methane gas). Recently, carbon fibers were produced by carbonization of polyethylene fibers with assistance of a sulfonation process.

Most methods used to prepare carbon fibers are expensive and/or time consuming. It is desirable to have a method of preparing carbon fibers specifically nonwoven carbon cloths from low cost starting materials without the need for high temperatures or transition metal catalysts.

BRIEF DESCRIPTION OF THE DRAWINGS

Advantages of the present invention will become apparent to those skilled in the art with the benefit of the following detailed description of embodiments and upon reference to the accompanying drawings in which.

While the invention may be susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF THE PREFERRED EMBODIMENTS

It is to be understood the present invention is not limited to particular devices or methods, which may, of course, vary. It is also to be understood that the terminology used herein is for the purpose of describing particular embodiments only, and is not intended to be limiting. As used in this specification and the appended claims, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a method or apparatus that "comprises," "has," "includes" or "contains" one or more steps or elements possesses those one or more steps or elements, but is not limited to possessing only those one or more steps or elements. Likewise, an element of an apparatus that "comprises," "has," "includes" or "contains" one or more features possesses those one or more features, but is not limited to possessing only those one or more features.

In one embodiment, carbon fibers may be formed from suitable polymeric precursors by treatment with acid vapors (e.g., sulfuric acid vapors) at temperatures below about 250° C. The polymeric precursors may be formed from polymeric fibers made from monomers with carbon backbones having hydrogen and/or oxygen as the only pendant groups. Fibers, in one embodiment, were prepared by the centrifugal spinning as described herein. Post treatment of the fibrous polymeric precursors with acid vapors causes a carbonization reaction where hydrogen and oxygen react with the acid vapors converting the polymeric precursors into carbon rich fibers. This process offers numerous advantages over previously described methods of producing carbon fibers. The polymeric precursor materials are cost effective. Many of the more suitable polymeric precursors are hydrophilic, allowing water to be used as a solvent during formation of the fibers. Water based fiber formation does not require energy to melt polymers although fiber formation through a melt based process is also possible. The yield of carbon fibers is high and the acid vapor treatment proved to be effective in a short period of time making it possible to apply this process for the continuous production of carbon fibers in the absence of the high temperatures typically needed for oxidation, carbonization, graphitization, and/or chemical reaction (in the case of vapor grown carbon nanofiber or carbon nanotubes) with a catalyst.

Formation of Polymeric Precursors

Polymeric precursors may be formed from carbon rich polymers. Particularly useful polymers include polyacrylonitrile ("PAN"), polyvinyl alcohol, cellulose polymers (e.g., viscose rayon and cotton), and pitch. Other polymers may be used. In some embodiments, water soluble or water dispersible polymers may be used. The use of water soluble or water dispersible polymers may allow processing with water, rather than organic polymer. Polymeric precursors may be formed form a variety of methods, including, but not limited to electrospinning and centrifugal spinning. Centrifugal spinning may be performed in the absence or presence of an electric field. Apparatuses and methods that may be used to create the polymeric precursor fibers using centrifugal spinning are described in the following U.S. Published Patent Applications: 2009/0280325; 2009/0269429; 2009/0232920; and 2009/0280207, all of which are incorporated herein by reference.

Figure 1A:
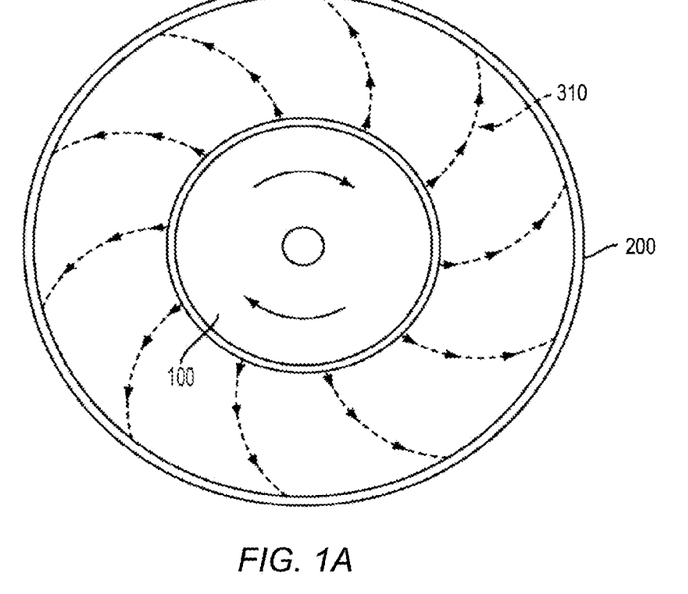
FIG. 1A shows a top view of a fiber producing device and a collection wall.
Figure 1B:
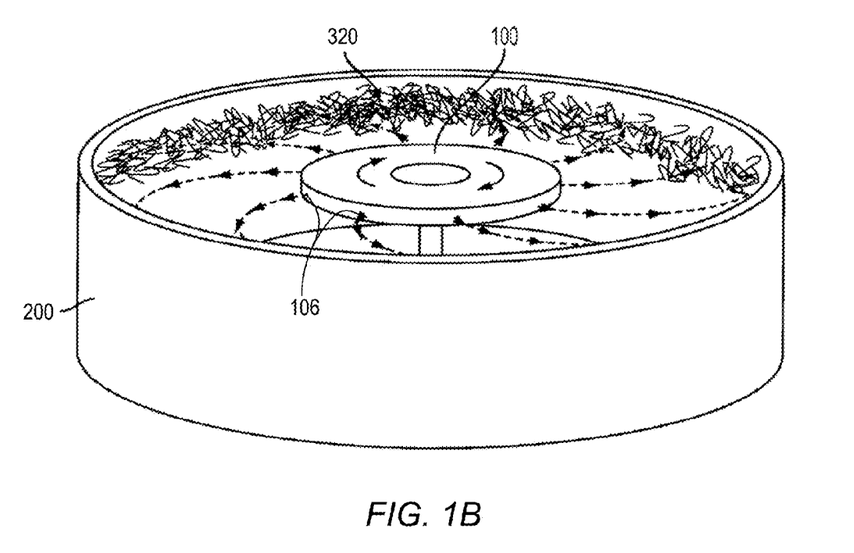
FIG. 1B shows a projection view of a fiber producing device that includes a fiber producing device as depicted in FIG. 1A and a collection wall.

FIG. 1A shows a top view of an exemplary fiber producing system that includes a fiber producing device 100 and a collection wall 200. FIG. 1B shows a projection view of a fiber producing system that includes a fiber producing device 100 and a collection wall 200. As depicted, fiber producing device 100 is spinning clockwise about a spin axis, and material is exiting openings 106 of the fiber producing device as fibers 320 along various pathways 310. The fibers are being collected on the interior of the surrounding collection wall 200.

Figure 2A:
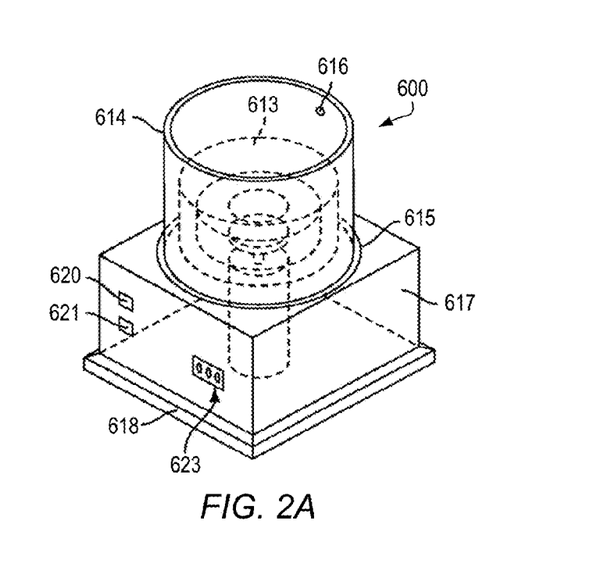
FIG. 2A shows a partially cut-away perspective view of an embodiment of a fiber producing system.
Figure 2B:
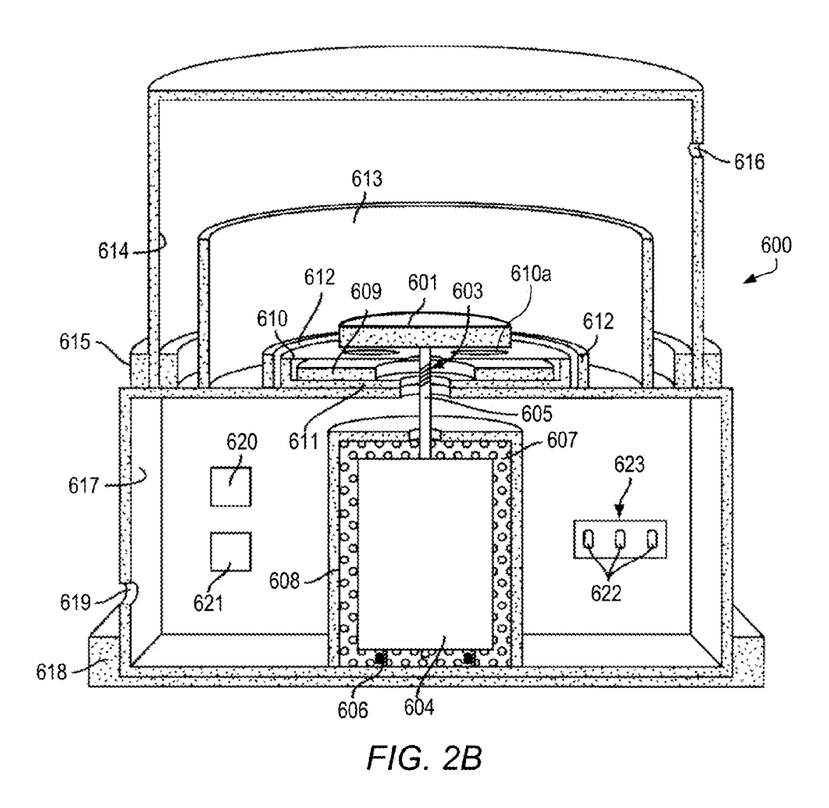
FIG. 2B depicts a cross-sectional view of a fiber producing system.

FIG. 2A shows a partially cut-away perspective view of an embodiment of a fiber producing system 600. FIG. 2B depicts a cross-sectional view of fiber producing system 600. System 600 includes fiber producing device 601, which has peripheral openings and is coupled to a threaded joint 603, such as a universal threaded joint, which, in turn, is coupled to a motor 604 via a shaft 605. Motor 604, such as a variable speed motor, is supported by support springs 606 and is surrounded by vibration insulation 607 (e.g., high-frequency vibration insulation). A motor housing 608 encases the motor 604, support springs 606 and vibration insulation 607. A heating unit 609 is enclosed within enclosure 610 (e.g., a heat reflector wall) that has openings 610a that direct heat (thermal energy) to fiber producing device 601. In the embodiment shown, heating unit 609 is disposed on thermal insulation 611. Surrounding the enclosure 610 is a collection wall 612, which, in turn, is surrounded by an intermediate wall 613. A housing 614 seated upon a seal 615 encases fiber producing device 601, heating enclosure 610, collection wall 612 and intermediate wall 613. An opening 616 in the housing 614 allows for introduction of fluids (e.g., gases such as air, nitrogen, helium, argon, etc.) into the internal environment of the apparatus, or allows fluids to be pumped out of the internal environment of the apparatus. The lower half of the system is encased by a wall 617 which is supported by a base 618. An opening 619 in the wall 617 allows for further control of the conditions of the internal environment of the apparatus. Indicators for power 620 and electronics 621 are positioned on the exterior of the wall 617 as are control switches 622 and a control box 623.

A control system of an apparatus 622 allows a user to change certain parameters (e.g., RPM, temperature, and environment) to influence fiber properties. One parameter may be changed while other parameters are held constant, if desired. One or more control boxes in an apparatus may provide various controls for these parameters, or certain parameters may be controlled via other means (e.g., manual opening of a valve attached to a housing to allow a gas to pass through the housing and into the environment of an apparatus). It should be noted that the control system may be integral to the apparatus (as shown in FIGS. 2A and 2B) or may be separate from the apparatus. For example, a control system may be modular with suitable electrical connections to the apparatus.

In certain methods described herein, material spun in a fiber producing device may undergo varying strain rates, where the material is kept as a melt or solution. Since the strain rate alters the mechanical stretching of the fibers created, final fiber dimension and morphology may be significantly altered by the strain rate applied. Strain rates are affected by, for example, the shape, size, type and RPM of a fiber producing device. Altering the viscosity of the material, such as by increasing or decreasing its temperature or adding additives (e g, thinner), may also impact strain rate. Strain rates may be controlled by a variable speed fiber producing device. Strain rates applied to a material may be varied by, for example, as much as 50-fold (e.g., 500 RPM to 25,000 RPM).

Temperatures of the material, fiber producing device and the environment may be independently controlled using a control system. The temperature value or range of temperatures employed typically depends on the intended application. For example, for many applications, temperatures of the material, fiber producing device and the environment typically range from −4° C. to 400° C. Temperatures may range as low as, for example, −20° C. to as high as, for example, 2500 C. For solution spinning, ambient temperatures of the fiber producing device are typically used.

As the material is ejected from the spinning fiber producing device, thin jets of the material are simultaneously stretched and dried in the surrounding environment. Interactions between the material and the environment at a high strain rate (due to stretching) lead to solidification of the material into polymeric fibers, which may be accompanied by evaporation of solvent. By manipulating the temperature and strain rate, the viscosity of the material may be controlled to manipulate the size and morphology of the polymeric fibers that are created. With appropriate manipulation of the environment and process, it is possible to form polymeric fibers of various configurations, such as continuous, discontinuous, mat, random fibers, unidirectional fibers, woven and unwoven, as well as fiber shapes, such as circular, elliptical and rectangular (e.g., ribbon). Other shapes are also possible. The produced fibers may be single lumen or multi-lumen.

By controlling the process parameters, fibers can be made in micron, sub-micron and nano-sizes, and combinations thereof. In general, the fibers created will have a relatively narrow distribution of fiber diameters. Some variation in diameter and cross-sectional configuration may occur along the length of individual fibers and between fibers.

Generally speaking, a fiber producing device helps control various properties of the fibers, such as the cross-sectional shape and diameter size of the fibers. More particularly, the speed and temperature of a fiber producing device, as well as the cross-sectional shape, diameter size and angle of the outlets in a fiber producing device, all may help control the cross-sectional shape and diameter size of the fibers. Lengths of fibers produced may also be influenced by fiber producing device choice.

The speed at which a fiber producing device is spun may also influence fiber properties. The speed of the fiber producing device may be fixed while the fiber producing device is spinning, or may be adjusted while the fiber producing device is spinning. Those fiber producing devices whose speed may be adjusted may, in certain embodiments, be characterized as "variable speed fiber producing devices." In the methods described herein, the structure that holds the material may be spun at a speed of about 500 RPM to about 25,000 RPM, or any range derivable therein. In certain embodiments, the structure that holds the material is spun at a speed of no more than about 50,000 RPM, about 45,000 RPM, about 40,000 RPM, about 35,000 RPM, about 30,000 RPM, about 25,000 RPM, about 20,000 RPM, about 15,000 RPM, about 10,000 RPM, about 5,000 RPM, or about 1,000 RPM. In certain embodiments, the structure that holds the material is rotated at a rate of about 5,000 RPM to about 25,000 RPM.

In an embodiment, material may be positioned in a reservoir of the fiber producing device. The reservoir may, for example, be defined by a concave cavity of the fiber producing device. In certain embodiments, the fiber producing device includes one or more openings in communication with the concave cavity. The fibers are extruded through the opening while the fiber producing device is rotated about a spin axis. The one or more openings have an opening axis that is not parallel with the spin axis. The fiber producing device may include a body that includes the concave cavity and a lid positioned above the body such that a gap exists between the lid and the body, and the nanofiber is created as a result of the rotated material exiting the concave cavity through the gap.

Certain fiber producing devices have openings through which material is ejected during spinning. Such openings may take on a variety of shapes (e.g., circular, elliptical, rectangular, square, triangular, or the like) and sizes: (e.g., diameter sizes of 0.01-0.80 mm are typical). The angle of the opening may be varied between ±15 degrees. The openings may be threaded. An opening, such as a threaded opening, may hold a needle, where the needle may be of various shapes, lengths and gauge sizes. Threaded holes may also be used to secure a lid over a cavity in the body of a fiber producing device. The lid may be positioned above the body such that a gap exists between the lid and the body, and a fiber is created as a result of the spun material exiting the cavity through the gap. Fiber producing devices may also be configured such that one fiber producing device may replace another within the same apparatus without the need for any adjustment in this regard. A universal threaded joint attached to various fiber producing devices may facilitate this replacement. Fiber producing devices may also be configured to operate in a continuous manner.

Any method described herein may further comprise collecting at least some of the microfibers and/or nanofibers that are created. As used herein "collecting" of fibers refers to fibers coming to rest against a fiber collection device. After the fibers are collected, the fibers may be removed from a fiber collection device by a human or robot. A variety of methods and fiber (e.g., nanofiber) collection devices may be used to collect fibers. For example, regarding nanofibers, a collection wall may be employed that collects at least some of the nanofibers. In certain embodiments, a collection rod collects at least some of the nanofibers. The collection rod may be stationary during collection, or the collection rod may be rotated during collection.

Regarding the fibers that are collected, in certain embodiments, at least some of the fibers that are collected are continuous, discontinuous, mat, woven, unwoven or a mixture of these configurations. In some embodiments, the fibers are not bundled into a cone shape after their creation. In some embodiments, the fibers are not bundled into a cone shape during their creation. In particular embodiments, fibers are not shaped into a particular configuration, such as a cone figuration, using air, such as ambient air, that is blown onto the fibers as they are created and/or after they are created.

Present method may further comprise, for example, introducing a gas through an inlet in a housing, where the housing surrounds at least the fiber producing device. The gas may be, for example, nitrogen, helium, argon, or oxygen. A mixture of gases may be employed, in certain embodiments.

The environment in which the fibers are created may comprise a variety of conditions. For example, any fiber discussed herein may be created in a sterile environment. As used herein, the term "sterile environment" refers to an environment where greater than 99% of living germs and/or microorganisms have been removed. In certain embodiments, "sterile environment" refers to an environment substantially free of living germs and/or microorganisms. The fiber may be created, for example, in a vacuum. For example the pressure inside a fiber producing system may be less than ambient pressure. In some embodiments, the pressure inside a fiber producing system may range from about 1 millimeters (mm) of mercury (Hg) to about 700 mm Hg. In other embodiments, the pressure inside a fiber producing system may be at or about ambient pressure. In other embodiments, the pressure inside a fiber producing system may be greater than ambient pressure. For example the pressure inside a fiber producing system may range from about 800 mm Hg to about 4 atmospheres (atm) of pressure, or any range derivable therein.

In certain embodiments, the fiber is created in an environment of 0-100% humidity, or any range derivable therein. The temperature of the environment in which the fiber is created may vary widely. In certain embodiments, the temperature of the environment in which the fiber is created can be adjusted before operation (e.g., before rotating) using a heat source and/or a cooling source. Moreover, the temperature of the environment in which the fiber is created may be adjusted during operation using a heat source and/or a cooling source. The temperature of the environment may be set at sub-freezing temperatures, such as −20° C., or lower. The temperature of the environment may be as high as, for example, 2500° C.

The fibers that are created may be, for example, one micron or longer in length. For example, created fibers may be of lengths that range from about 1 μm to about 50 cm, from about 100 μm to about 10 cm, or from about 1 mm to about 1 cm. In some embodiments, the fibers may have a narrow length distribution. For example, the length of the fibers may be between about 1 μm to about 9 μm, between about 1 mm to about 9 mm, or between about 1 cm to about 9 cm. In some embodiments, when continuous methods are performed, fibers of up to about 10 meters, up to about 5 meters, or up to about 1 meter in length may be formed.

In certain embodiments, the cross-section of the fiber may be circular, elliptical or rectangular. Other shapes are also possible. The fiber may be a single-lumen lumen fiber or a multi-lumen fiber.

In another embodiment of a method of creating a fiber, the method includes: spinning material to create the fiber; where, as the fiber is being created, the fiber is not subjected to an externally-applied electric field or an externally-applied gas; and the fiber does not fall into a liquid after being created.

Formation of Activated Carbon from Polymeric Precursor Fibers

In another embodiment, carbon fibers are produced by subjecting the polymer precursor to acid vapors at temperatures below about 250° C. Acid treatment converts at least a portion of the polymer precursor fibers to carbon fiber. A polymer precursor containing a carbon backbone having hydrogen and/or oxygen (the hydroxyl (—OH) group) pendant groups can be partially removed during acid vapor treatment.

Figure 7:
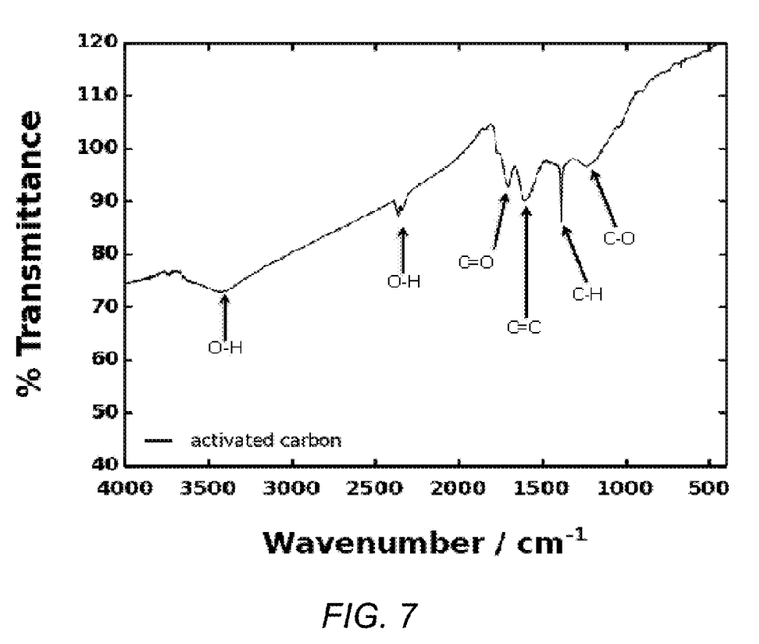
FIG. 7 depicts a Fourier-Transform Infrared Spectroscopy analysis of an activated carbon mat.

In an embodiment, activated carbon fiber is produced by taking the partially carbonized fiber and subjecting the carbonized fiber to heat at temperatures ranging from 200 to about 800° C. under an inert gas or below 500° C. under air with a ramping rate 2-10° C./min. The heat treatment causes the remaining hydrogen and/or oxygen pendent groups to be converted to stabilized polyene, carbonyl and/or carboxylic acid groups, and graphitic functional groups (see FIG. 7).

Activated carbon and/or carbon fiber have useful applications in water and/or air filtration (U.S. Pat. No. 4,576,929, U.S. Pat. No. 6,702,875). Carbon fiber undergoing heat or chemical treatment results in the activation of carbon fiber with increased porosity, higher surface area (U.S. Pat. No. 5,827,355) and/or the addition of specific functional groups (U.S. Pat. No. 7,505,225). Activated carbon fiber is often derived from polymer precursors such as acrylic fibers, e.g. polyacrylonitrile (PAN), pitch, rayon, and resin. Several stages of heat treatment are carried out to produce carbon fiber. The carbon fiber may be pulverized or chopped to increase the surface area. Activation using steam, carbon dioxide, and oxygen, for instance, results in increased porosity (mesoporous and microporous) and surface area. Activation can also incorporate active functional groups such as carboxyl (—RCOOH), hydroxyl groups (—OH), oxidized groups, or any known chemical functional group (polar and/or nonpolar) depending on the activation process in other embodiments. Highly polarized functional groups can have electrostatic interactions such as van der Waals and/or dipole-dipole interactions in addition to adhesive forces. These electrostatic interactions exerted by the activated carbon fiber enhance and contribute to adsorption of chemical and/or particle contaminants that may or may not be charged. The active molecular functional groups can be configured for adsorbing specific chemical contaminants, whereas the pores help filter particle contaminants. The presence and variety of active molecular functional groups will increases the probability for adsorbing a broad class of chemical, particulate, and other contaminants. Activated carbon fiber incorporated into traditional or novel water and/or gas filters will therefore give a unique advantage over other filters.

The methods described herein allow for the production of highly porous nonwoven carbon cloths or yarns with micro- and mesoporosity. The fiber diameter can be tuned in the range of hundreds of nanometers to several microns. The produced material shows high electrical conductivity, shielding of electromagnetic interference, mechanical integrity, high surface area, thermal stability, and superhydrophobic and superoleophilic behavior.

The enhanced superhydrophobicity of porous carbon materials extends the range of applications to gas diffusion media for fuel cells, non-wetting liquid transfer materials, water/oil separation, and oil spill cleanup. The electrical resistivity of the acid treated mats was on average 165 Ωcm ($6.1$ $e^{-1}$ S m$^{-1}$). After heat treatment the electrical resistivity of the carbon mat further decreased to 0.407 Ωcm (2.46 S cm$^{-1}$). The mechanical integrity of the developed fibers was evaluated by dynamic mechanical analysis. The modulus of elasticity for the PVA nanofibers, acid treated nanofibers mats, and heat treated nanofiber mats was found to be 0.6, 1.2, and 4.7 GPa respectively. A tensile strength of 110 MPa was obtained for the heat treated nonwoven nanofiber mats. These tests confirm that our carbon based materials have mechanical strengths similar to that of buckypaper and grapheme based composites, making them suitable for oleophilic and filtration materials.

The wetting properties of the developed nonwoven carbon nanofiber mats were evaluated. Given the special hierarchical surface structure of the nonwoven mat which increases its surface roughness, a hydrophobic behavior was observed. Contrary to water, organic compounds, hydrocarbons, alcohols, and oils, were readily absorbed by the mats. The weight-to-weight absorption capacity (W(wt/wt)); defined as the ratio of the final mat weight after absorption over the initial mat weight mat before absorption, for various solvents was measured. To test the oil absorption properties of the carbon mat, a series of experiments were carried out to separate oil from water. After the mat is saturated with oil, it can be burned and reused several times. The burning of the oil does not destroy the mat, and after the oil evaporates there is no significant oxidation to the mat. The fiber morphology remains intact after several cycles.

Fibers discussed herein are a class of materials that exhibit an aspect ratio of at least 100 or higher. The term "microfiber" refers to fibers that have a minimum diameter in the range of 10 microns to 700 nanometers, or from 5 microns to 800 nanometers, or from 1 micron to 600 nanometers. The term "nanofiber" refers to fibers that have a minimum diameter in the range of 500 nanometers to 1 nanometer; or from 250 nanometers to 10 nanometers, or from 100 nanometers to 20 nanometers.

Fibers may be analyzed via any means known to those of skill in the art. For example, Scanning Electron Microscopy (SEM) may be used to measure dimensions of a given fiber. For physical and material characterizations, techniques such as differential scanning calorimetry (DSC), thermal analysis (TA) and chromatography may be used.

Formation of Carbon Fibers from Polymeric Precursor Fibers

Figure 5A:
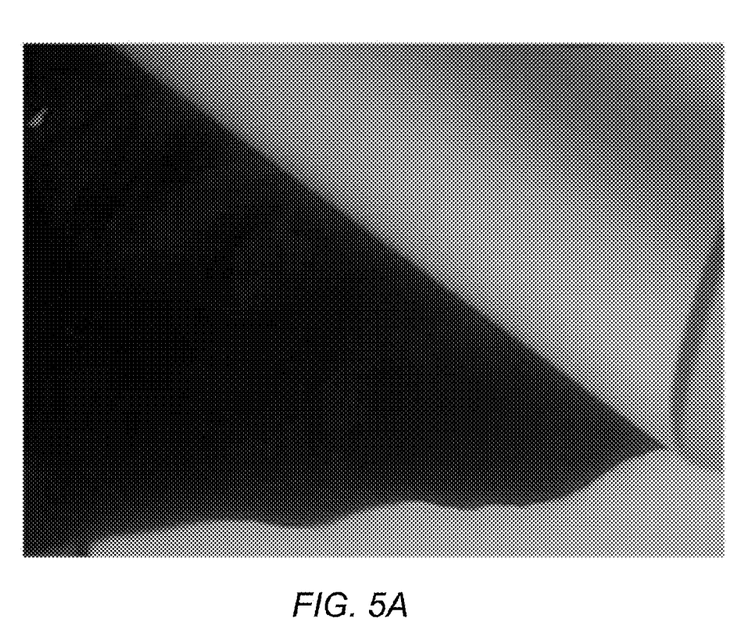
FIG. 5A depicts a photograph of a carbon fiber mat.
Figure 5B:
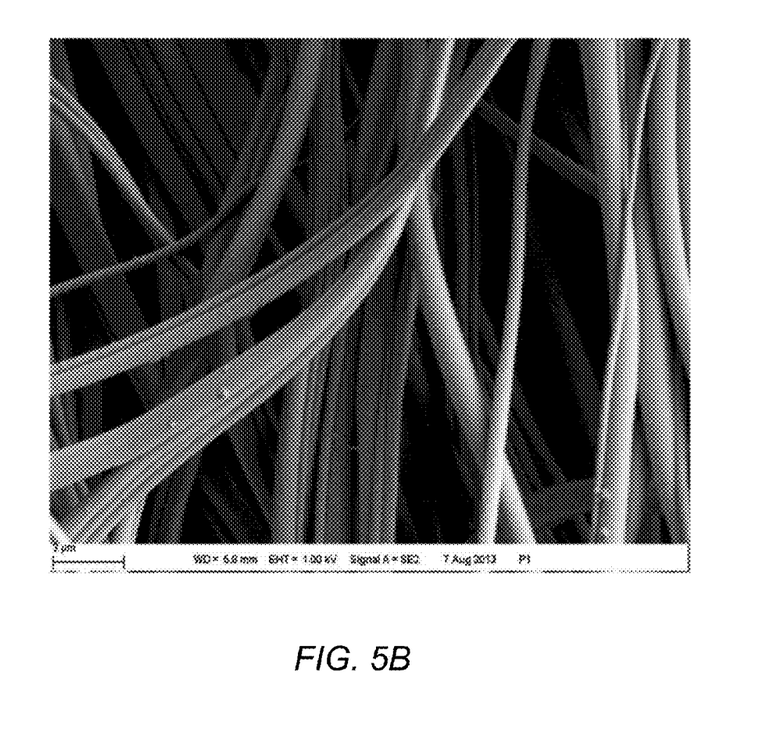
FIG. 5B depicts an SEM photograph of the carbon fiber mat of FIG. 5A.
Figure 6:
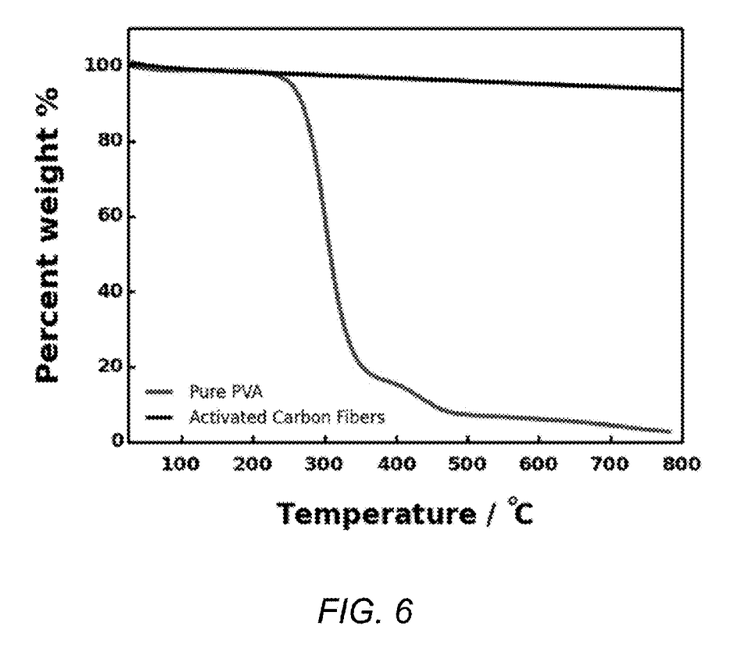
FIG. 6 depicts a thermogravimetric analysis of PVA and activated carbon fibers.

In one embodiment, carbon fibers may be produced by subjecting the polymer precursor fibers to acid vapor at temperatures below about 250° C. Unlike prior art methods, the acid treatment coverts at least a portion of the polymer precursor fibers into carbon fibers, without the need of temperatures above 250° C. (i.e., without carbonization of the polymer precursor) as seen in FIGS. 5 and 6.

In an embodiment, concentrated aqueous sulfuric acid is used to form an acid vapor. A specified amount of concentrated sulfuric acid is used, sufficient to create a vapor-liquid equilibrium. Sulfuric acid has oxidizing/dehydrating properties (contains oxygen unlike hydrochloric acid) where the resulting chemical composition of the liquid/vapor that reacts with the fiber is composed of water, sulfur trioxide, hydrogen sulfate, and a solvated water-sulfuric acid molecule. The vapor-liquid mixture is formed in a closed apparatus and maintained at temperatures less than 250° C. The polymer precursor fibers are placed in the chamber such that the fibers are in contact with the vapors (but not the liquid). The sulfuric acid vapors react with the polymer precursor (for example, via oxidation and dehydration reactions) to convert the polymer into carbon fibers.

Sulfuric acid vapors were found to be particularly useful, since the vapors are capable of causing both oxidation and dehydration of the polymer precursors. Prior art methods that rely on acids such as hydrochloric acid, bromic acid, formic acid, acetic acid, nitrous oxide gas, sulfur dioxide gas or acid anhydrides generally only initiate dehydration of the product. These acids generally fail to oxidize the polymeric precursors. Thus, methods that rely on these acids require a subsequent carbonization step (heating the acid treated polymer to temperature above 200° C.) to form the carbon fibers.

Figure 3:
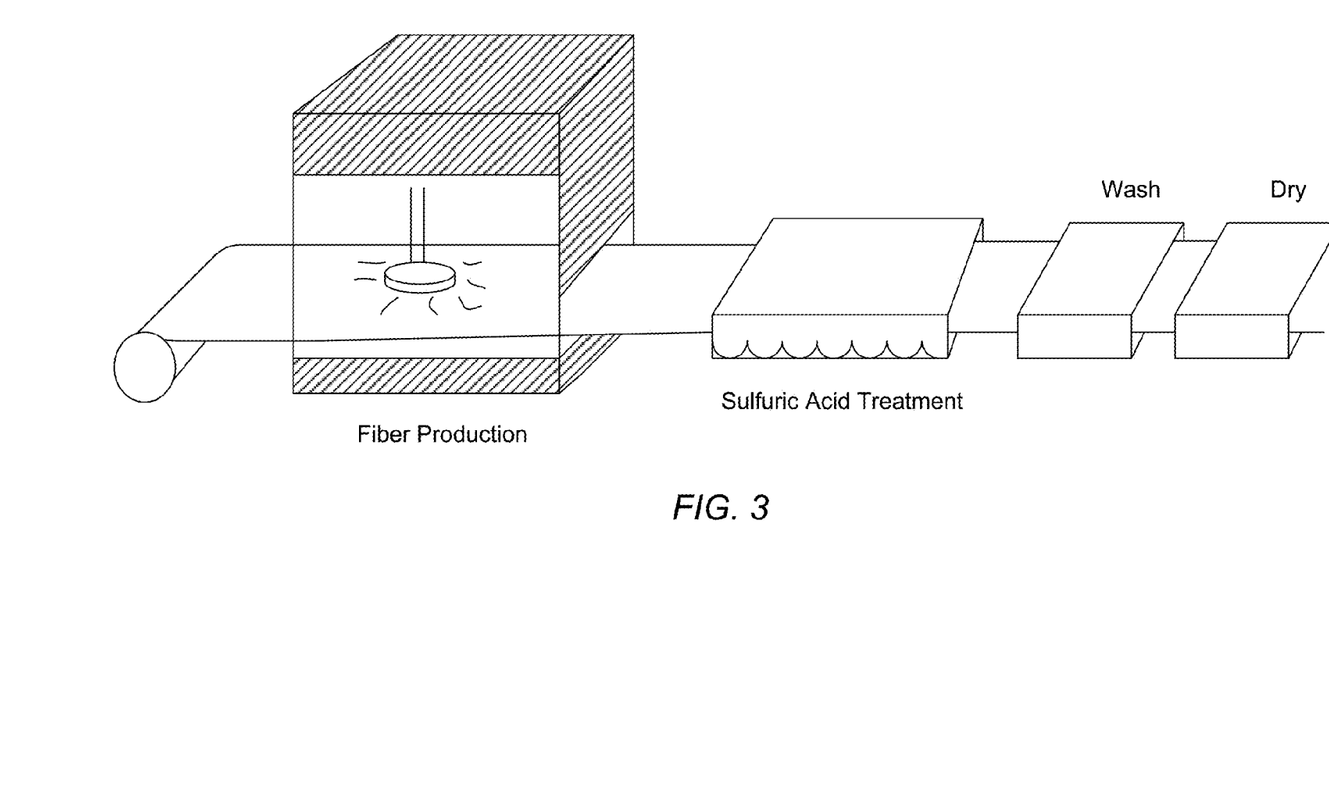
FIG. 3 depicts a schematic diagram of a fiber producing system for depositing fibers onto a moving substrate and includes a carbonization apparatus.

An embodiment of an exemplary system for preparing nonwoven carbon cloths either as stand-alone cloth, as a carbon fiber coating on an existing substrates, or to embedded substrates with carbon fibers is shown in FIG. 3. The system of FIG. 3 may be used for the mass production of fibers to be spooled into yarns or nonwoven carbon fiber cloths from polymeric resins with control over surface area and porosity. The polymeric precursor is prepared as a solution or melt and introduced into a fiber producing system. The fiber producing system prepares fiber of the polymeric precursor which has the desired morphology (e.g., diameter, length, etc.). In some embodiments, the polymer fibers are deposited onto or into a substrate during the fiber formation process or produced as a self-standing mat. In other embodiment, fibers are to be made, before undergoing acid treatment, into spooled yarns. The substrate is then carried into the acid vapor treatment chamber.

For sheet like substrates transversal restraining and longitudinal extension provide tension needed to further promote crystallinity and orientation while reducing defects. The rolls are though adjusted in width as well as the speed of longitudinal direction to accommodate for the intrinsic shrinkage. The mats can then be deposited in a substrate and roll, cut, folded, or treated as self-standing laminates that can be stacked for thicker laminates or used as prepregs for composite systems. The final mats are high performance materials that can be used due to their physical strength, toughness, light weight, dimensional stability, low coefficient of thermal expansion, vibration damping, electrical conductivity, flexibility, biological inertness, x-ray permeability, self lubrication, corrosion resistance, electromagnetic shielding, filtration given the small pore size resulting from nanofiber mats (active carbon materials), and high temperature fire retardant insulation to mention an attractive application for nonwoven textiles.

The acid chamber may be sealed to allow the formation of a liquid-vapor equilibrium of the concentrated acid solution. The chamber does not have to be hermetically sealed to achieve sufficient liquid-vapor equilibrium. For example, the chamber may have small unsealed ports or ports that allow a moving substrate to pass or exit through the acid treatment chamber.

The substrate may be moved into a washing chamber followed by a drying chamber. The washing chamber may be used to remove acid vapor components that have adhered to the fibers during acid treatment. In some embodiment, washing chamber may use water to wash the formed carbon fibers. After the carbon fibers are washed, the substrate is conveyed into a drying chamber where the fibers are dried using heat and/or vacuum.

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

Example 1

A 5-14% by weight solution of polyvinyl alcohol (PVA) in distilled or deionized water was prepared. The mixture of PVA and water was heated at low temperatures (about 60-80° C.) to obtain a homogenous solution.

Figure 4A:
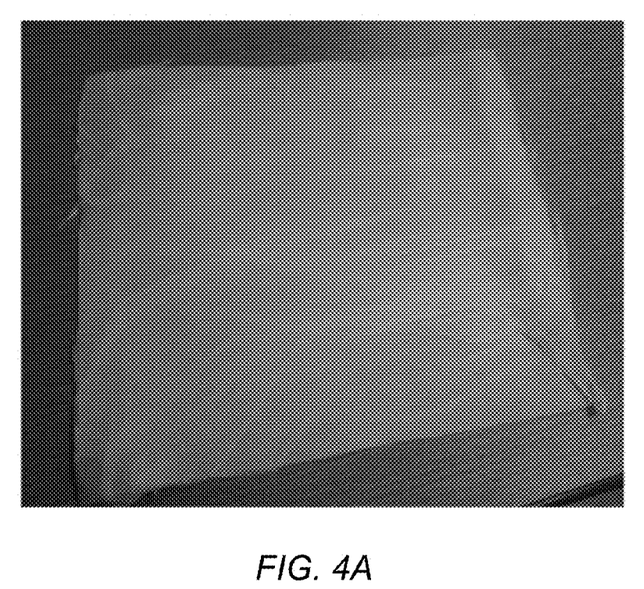
FIG. 4A depicts a photograph of a polymer precursor mat.
Figure 4B:
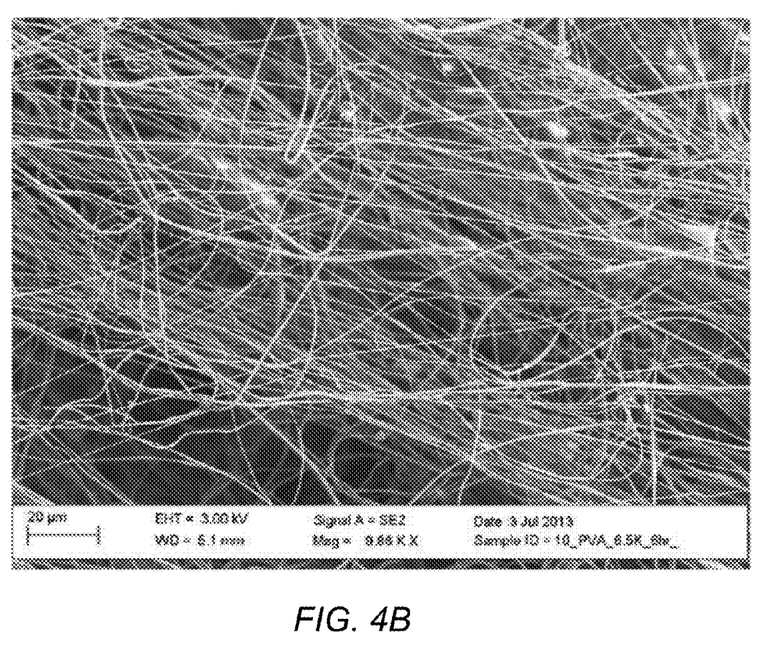
FIG. 4B depicts an SEM photograph of the polymer precursor mat of FIG. 4A.

The resulting solution was placed into a fiber producing device and spun into fibers. The fibers were collected as a mat as shown in FIG. 4A. An SEM photograph of the polymer web is shown in FIG. 4B.

The mat was treated with sulfuric acid fumes in a closed apparatus, heated between about 80° C. to less than about 250° C. (mainly to speed up the reaction). This treatment converted the polymer precursor fibers into carbon fibers. FIG. 5A shows the produced carbon fiber mat. FIG. 5B shows an SEM photograph of the produced carbon fibers. The scanning electron micrograph shows that after the conversion to pure carbon the structure is still homogenous, long continuous fibers.

A thermogravimetric analysis conducted on the polymeric nanofiber mat and on the carbon nonwoven carbon nanofiber mat shows the corresponding degradation temperature. (See FIG. 6). As expected the polymer degrades at temperatures below 400° C. while the carbon nanofiber mat withstands temperatures above 800° C. without degradation.

Example 2

A 5-14% by weight solution of polyvinyl alcohol (PVA) in distilled or deionized water was prepared. The sample was heated at low temperatures (60-80° C.) and stirred to obtain a homogenous solution.

The resulting solution was placed into a fiber producing device and spun into fibers. The fibers were collected as a mat as shown in FIG. 4A. An SEM photograph of the polymer web is shown in FIG. 4B.

The mat was treated with sulfuric acid fumes in a closed apparatus, heated between about 80° C. to less than about 250° C. This treatment converted a portion of the polymer precursor fibers into carbon fibers. Activation of carbon fiber is carried out by heat treatment of the mat at 400° C. under an inert gas ($N_2$) with ramping rate of 10° C./min. Heat causes the remaining pendant groups to be converted to a stabilized carbonyl or carboxylic acid group (see FIG. 7.) This results in a carbon fiber mat containing functional groups, which can assist in the removal of contaminants for water and/or air filtration.

In this patent, certain U.S. patents, U.S. patent applications, and other materials (e.g., articles) have been incorporated by reference. The text of such U.S. patents, U.S. patent applications, and other materials is, however, only incorporated by reference to the extent that no conflict exists between such text and the other statements and drawings set forth herein. In the event of such conflict, then any such conflicting text in such incorporated by reference U.S. patents, U.S. patent applications, and other materials is specifically not incorporated by reference in this patent.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method of producing activated carbon fibers and/or carbon fiber cloths, comprising:
    placing a polymer into a body of a fiber producing device, the body comprising one or more openings, wherein the polymer comprises a carbon backbone having hydroxyl (—OH) pendant groups;
    rotating the fiber producing device at a speed of at least about 500 rpm, wherein rotation of the fiber producing device causes the polymer in the body to be passed through one or more openings to produce microfibers and/or nanofibers comprising the polymer;
    collecting at least a portion of the produced microfibers and/or nanofibers as fibers, yarns or self-standing nonwoven fine fiber cloths;
    placing the polymeric fibers in a chamber comprising aqueous sulfuric acid vapors produced from an aqueous sulfuric acid composition at a temperature of less than 250° C. for a time sufficient to dehydrate at least a portion of the polymer fibers to produce partially carbonized polymer fibers.

2. The method of claim 1, wherein the microfibers and/or nanofibers are created without subjecting the fibers, during their creation, to an externally applied electric field.

3. The method of claim 1, wherein the polymer is a water soluble polymer.

4. The method of claim 1, wherein the polymer is polyvinyl alcohol.

5. The method of claim 1, further comprising dissolving and/or suspending the polymer in water prior to placing the polymer into the body of the fiber producing device.

6. The method of claim 5, wherein the concentration of polymer in water is at least 5% by weight.

7. The method of claim 1, further comprising positioning a substrate under the fiber producing device, wherein the produced microfibers and/or nanofiber mats are deposited onto a substrate or clamped at the edges for stand-alone nonwoven carbon fiber cloths.

8. The method of claim 7, further comprising positioning the substrate in the chamber comprising aqueous sulfuric acid vapors.

9. The method of claim 1, further comprising:
    washing the fibers after the fibers have been treated with sulfuric acid vapors;
    drying the fibers.

10. The method of claim 1, further comprising placing the partially carbonized polymer fibers into a furnace and heating from 200 to 800° C. at a ramping rate between 2-10° C./min to convert the partially carbonized polymer fibers to activated carbon.

11. The method of claim 1, further comprising placing the partially carbonized polymer fibers into a furnace and heating at a temperature between 800-2500° C. to produce carbon fiber.

* * * * *